Sept. 19, 1933.  F. MARTH  1,927,411

MECHANICAL AUTOMOBILE JACK

Filed April 16, 1931

INVENTOR
F. Marth

BY HIS ATTORNEY F. Ledermann

Patented Sept. 19, 1933

1,927,411

UNITED STATES PATENT OFFICE 1,927,411

MECHANICAL AUTOMOBILE JACK

Fritz Marth, New York, N. Y.

Application April 16, 1931. Serial No. 530,557

2 Claims. (Cl. 254—86)

The main object of this invention is to provide a jack which will selectively lift any of the wheels of an automotive vehicle above the traction surface so that tires may be changed.

Another object of the invention is to provide a tire jack with which the car is permanently equipped and which is adapted to be operated by the transmission shaft of the vehicle to lift all or any of the wheels of the vehicle above the traction surface.

The above and other objects will become apparent in the description below in which characters of reference refer to like-named parts in the drawing.

Referring briefly to the drawing, Figure 1 is a top plan view of a wheeled auto chassis showing the jacks mounted thereon in operative position.

Figure 1:
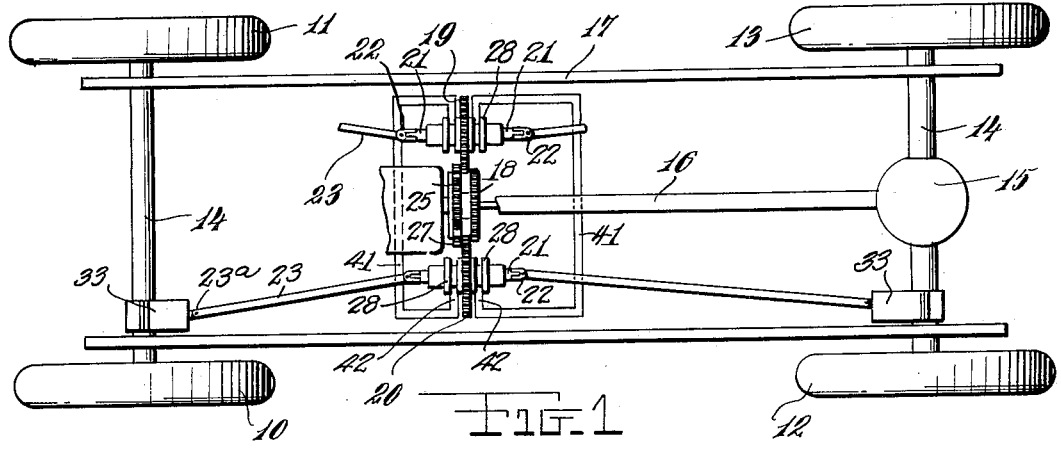
Figure 2:
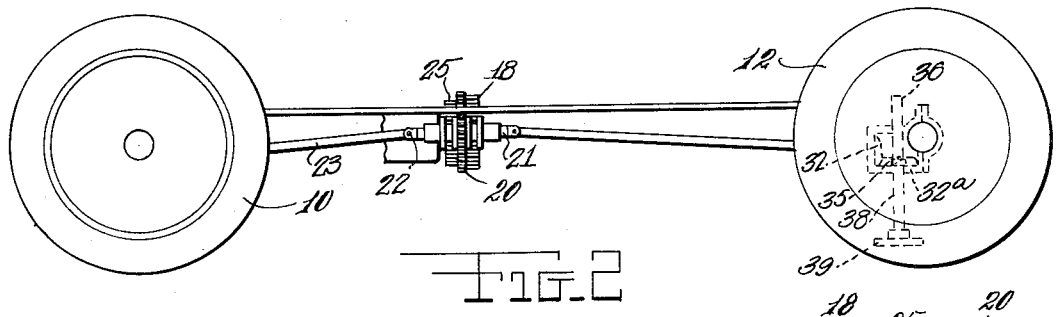
Figure 2 is a side elevational view of Figure 1.
Figure 3:
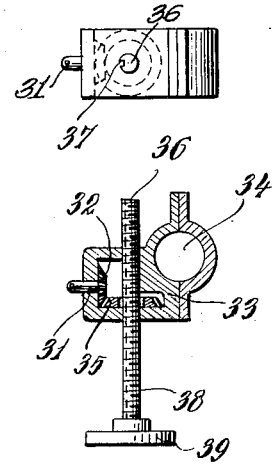
Figure 3 is a longitudinal, sectional, elevational view of one of the auto jack lifts.
Figures 4, 5:
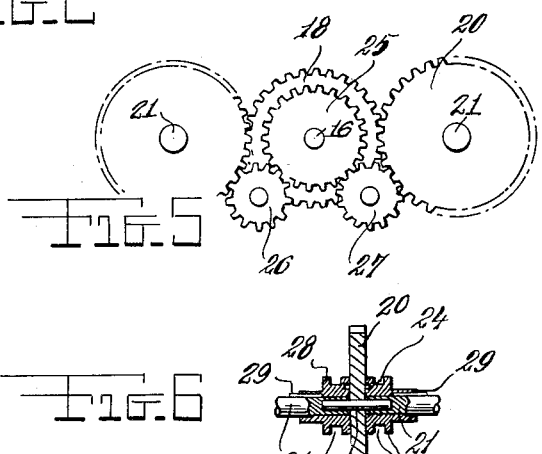
Figure 4 is a top plan view of Figure 3.
Figure 5 is a longitudinal, elevational view of the rotating mechanism.
Figure 6:
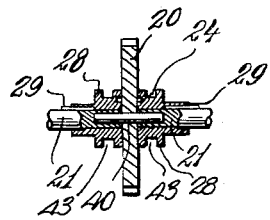
Figure 6 is a sectional, elevational view of the clutch.

Referring in detail to the drawing the numerals 10 and 11 indicate the forward wheels of an automotive vehicle, and the numerals 12 and 13 indicate rear traction wheels. These traction wheels are provided with axles 14, the rear one of which is provided with a gear housing 15 from which a transmission shaft 16 extends forwardly of the vehicle. The axles 14 of the vehicle support side chassis frame members 17 which are arranged adjacent the wheels of the auto. The transmission shaft 16 has a gear 18 mounted thereon which is adapted to mesh with driving gears 19 and 20 arranged diametrically opposite each other. The driving wheels 19 and 20 are rigidly mounted upon stub connecting shafts 40 which are rotatably mounted in sockets at the ends of the shafts 21. The latter at their rear ends are provided with universal joints 22 to which are connected angular drive shafts 23. One face of the spur gears 19 and 20 is provided with raised pins 24. A second driving gear 25 is mounted on and driven by the main shaft 16 of the device. This driving gear 25 is smaller than the driving gear 18 and is permanently in mesh with a pair of idler pinions 26 and 27. These idler pinions are mounted on the same supporting structure as gears 18 and 25, and are adapted to mesh with the gear wheels 19 and 20 with which they cooperate. Hence, when gears 18 and 25 are shifted to the right (Fig. 1), the rotation of the gear 25 is transmitted to the gears 19 and 20 through the pinions 26 and 27.

Each driven shaft 23 is connected by a universal joint 23a to the short shaft extension 31 of a bevel gear 32. The short shaft extension 31 is journaled in a housing 32a which is provided with a saddle 33 in the opening 34 of which the axles 14 of the vehicle are received for purposes of securing the jack frame 32a to the respective ends of the axles. The bevel gear 32 meshes with a second floating gear 35 which is provided with an axial threaded opening receiving therein and engaging the threads of a lifter posts 36. The lifter post 36 is nonrotatable, simply being moved up and down by providing a key 37 which enters into a keyway 38 in the jack lifter post. The lower ends of these jack lifter posts are provided with foot plates 39 which rest upon the traction surface when the jacks are in operation.

The mechanism provided in combination with a wheeled vehicle is adapted to selectively lift any of the wheels above the traction surface when it is desired to accomplish such work as changing a tire, during which operation the wheels must be clear and free of the traction surface. As the shaft 16 rotates, it carries with it both gears 25 and 18. These gears are both shifted as a unit by a lever, not shown. When shifted to the right (Fig. 1), gear 25 meshes with, and transmits rotation to, the pinions 26 and 27, causing rotation of the gears 19 and 20 in one direction. When it is desired to rotate the gears 19 and 20 in the opposite direction, the gear unit 25—18 is shifted to the left (Fig. 1), causing gear 18 to mesh with gears 19 and 20. To selectively operate either the rear or the front pair of jacks, the clutch collars for the selected pair of jacks, indicated by the numeral 28, are shifted from the disengaged positions into engaging positions where the pins 24 register in openings in the clutch collars and thus lock the clutch collars against either the left or the right hand sides (Fig. 1) of the gears 19 and 20. These clutch collars 28 are longitudinally slidable on the shafts 21 and are prevented from rotating by keys 29 which register in channels in the collars. The shifting of the clutch collars 28 is accomplished by means of yokes 41 having hooks 42 engaging the collars in grooves 43, the levers for shifting the yokes not being shown. The drive shafts 23, when rotated, will cause rotation of the bevel gears 32 which in turn rotate the floating bevel gears 35. Rotation of the latter will raise or lower the lifting posts 36 and hence either the front or rear of the vehicle.

It is also to be noted that certain changes in form and construction may be made without departing from the spirit and scope of the invention.

I claim:

1. In an automotive vehicle having a transmission shaft, a pair of parallel spaced-apart gears rotatable by said shaft and adapted to be shifted longitudinally thereon, a jack arranged adjacent each wheel of the vehicle, said jack comprising a threaded lifting post, a frame having said post slidable therein, a bevel gear having threads rotatably engaging said post, a second bevel gear in mesh with said first bevel gear adapted when rotated to reciprocate said post, said post having a keyway, a key on said frame registering in said keyway, a drive shaft connected to said second bevel gear, one such drive shaft being provided for each jack, said drive shafts extending toward the middle of the vehicle frame and having small shafts connected thereto at their terminations, the free ends of said small shafts having sockets therein, said small shafts of the two drive shafts on each side of the vehicle being mutually aligned, a stub shaft rotatably mounted in the aligned sockets of said two small shafts, a gear rigidly mounted on each of said stub shafts, a collar slidably mounted on and keyed to each end of each of said small shafts, means partly on said collars and partly on each side of each of said last-named gears for mutually interlocking said collars with said last-named gears, pinions lying in mesh with one of said first-named gears adapted to be meshed with said last-named gears when said first-named gears are shifted to one position, said last-named gears and the other of said first-named gears being adapted to intermesh when said first-named gears are shifted to the opposite position.

2. In an automotive vehicle having a transmission shaft, a pair of spaced-apart parallel gears rotatable by said shaft and adapted to be shifted longitudinally thereon, a jack arranged adjacent each wheel of the vehicle, a drive shaft extending from each of said jacks in a direction toward said gears, said jacks having means for raising or lowering the same upon rotation of said drive shafts, small shafts having sockets in their extremities, the ends of said drive shafts opposite said jacks being connected to said small shafts, each pair of said small shafts on either side of the vehicle being mutually aligned and having a stub shaft rotatably mounted in their aligned sockets, a gear rigidly mounted on each of said stub shafts, collars slidably mounted on and keyed to each end of said stub shafts, means partly on said collars and partly on each side of said last-named gears for mutually interlocking said collars and last-named gears, pinions in mesh with one of said first-named gears, the shifting of said first-named gears causing alternate meshing of said pinions with said last-named gears and of the other of said first-named gears with said last-named gears.

FRITZ MARTH.